(12) United States Patent
Wada

(10) Patent No.: US 10,745,061 B2
(45) Date of Patent: Aug. 18, 2020

(54) VEHICLE REAR STRUCTURE

(71) Applicant: TOYOTA JIDOSHA KABUSHIKI KAISHA, Toyota-shi, Aichi-ken (JP)

(72) Inventor: Chihiro Wada, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 16/198,979

(22) Filed: Nov. 23, 2018

(65) Prior Publication Data

US 2019/0168815 A1 Jun. 6, 2019

(30) Foreign Application Priority Data

Dec. 5, 2017 (JP) .................. 2017-233335

(51) Int. Cl.
  *B62D 25/08* (2006.01)
  *B62D 25/02* (2006.01)
  *B62D 27/02* (2006.01)
  *B62D 25/04* (2006.01)

(52) U.S. Cl.
  CPC ............. *B62D 25/08* (2013.01); *B62D 25/02* (2013.01); *B62D 25/025* (2013.01); *B62D 25/04* (2013.01); *B62D 27/023* (2013.01)

(58) Field of Classification Search
  CPC ...... B62D 25/08; B62D 27/023; B62D 25/04; B62D 25/025; B62D 25/02

USPC .......................................................... 296/191
See application file for complete search history.

(56) References Cited

U.S. PATENT DOCUMENTS 8,967,704 B2 * 3/2015 Kurokawa ........... B62D 25/025
                                              296/193.06

FOREIGN PATENT DOCUMENTS

JP      2000-211549 A       8/2000
JP      2017-077778 A       4/2017

* cited by examiner

*Primary Examiner* — Pinel E Romain
(74) *Attorney, Agent, or Firm* — Oliff PLC

(57) ABSTRACT

A vehicle rear structure includes a rocker outer panel, a wheel house outer panel, a rocker outer extension that forms a closed section together with the wheel house outer panel, and a bulk disposed between the wheel house outer panel and the rocker outer extension. The bulk includes a first plate portion, a flange portion provided in an inner end portion of the first plate portion in a vehicle width direction, and a flange portion provided in an outer end portion of the first plate portion in the vehicle width direction. The flange portion on the inner side in the vehicle width direction is joined to the wheel house outer panel, and the flange portion on the outer side in the vehicle width direction is joined to the rocker outer extension.

9 Claims, 12 Drawing Sheets

VEHICLE REAR STRUCTURE

CROSS-REFERENCE TO RELATED APPLICATIONS

The disclosure of Japanese Patent Application No. 2017-233335 filed on Dec. 5, 2017 including the specification, drawings and abstract is incorporated herein by reference in its entirety.

BACKGROUND

1. Technical Field

The disclosure relates to a vehicle rear structure.

2. Description of Related Art

There is a conventionally known vehicle rear structure that includes a rocker outer panel extending in a vehicle front-rear direction, and a wheel house outer panel disposed behind the rocker outer panel in the vehicle front-rear direction (for example, see Japanese Unexamined Patent Application Publication No. 2017-77778 (JP 2017-77778 A)).

In the vehicle rear structure described in JP 2017-77778 A, a quarter rock pillar reinforcement (a reinforcing panel) is provided in order to reinforce a wheel house. The quarter rock pillar reinforcement is joined to a rear end portion of the rocker outer panel, and is also joined to the wheel house outer panel.

SUMMARY

In the conventional vehicle rear structure described above, there is a room for improvement in restraining deformation of a connecting portion between a rocker and the quarter rock pillar reinforcement (a closed section provided by the wheel house outer panel and the quarter rock pillar reinforcement) when the connecting portion is twisted when, for example, there is a reverse phase input to a suspension (when loads from a road surface are input in vertically reverse phases between front and rear wheels, and between right and left wheels).

The disclosure provides a vehicle rear structure that is able to restrain deformation of the vehicle rear structure when it is twisted.

A vehicle rear structure according to a first aspect of the disclosure, includes a rocker outer panel, a wheel house outer panel, a reinforcing panel, and a reinforcing member is provided. The rocker outer panel is a panel extending in a front-rear direction of a vehicle. The wheel house outer panel is disposed behind the rocker outer panel in the front-rear direction of the vehicle. The reinforcing panel is joined to a rear end portion of the rocker outer panel, and forms a closed section together with the wheel house outer panel. The reinforcing member is disposed between the wheel house outer panel and the reinforcing panel. The reinforcing member includes a first plate portion, an inner mounting plate portion, and an outer mounting plate portion. The inner mounting plate portion is provided in an inner end portion of the first plate portion in a width direction of the vehicle, and the outer mounting plate portion is provided in an outer end portion of the first plate portion in the width direction of the vehicle. Then, the inner mounting plate portion is joined to the wheel house outer panel, and the outer mounting plate portion is joined to the reinforcing panel.

Also, in the first aspect, the reinforcing panel may be a rocker outer extension. The rocker outer extension may be joined to the rear end portion of the rocker outer panel from an outer side in the width direction of the vehicle. The rocker outer extension may be configured to expand the rocker outer panel.

With the configuration of the vehicle rear structure, the closed section formed by the wheel house outer panel and the reinforcing panel is reinforced by the reinforcing member. Therefore, for example, even when the closed section is twisted due to a reverse phase input to a suspension, it is possible to restrain deformation (sectional collapse) of the closed section.

Further, in the first aspect, the first plate portion may be disposed so as to partition the closed section. Also, in the vehicle rear structure, the inner mounting plate portion, the outer mounting plate portion, and the first plate portion may configure a first U-shaped portion that has a substantially U-shaped section.

With the configuration of the above aspect, it is possible to effectively restrain deformation of the closed section.

Furthermore, in the first aspect, the reinforcing member includes a second plate portion, and a first mounting plate portion. The second plate portion is provided in an end portion of the first plate portion in a direction that intersects with the width direction of the vehicle, and the first mounting plate portion is provided in an outer end portion of the second plate portion in the width direction of the vehicle. The second plate portion and the first mounting plate portion may be joined to the reinforcing panel.

With the configuration of the above aspect, the reinforcing panel is reinforced by the second plate portion and the first mounting plate portion.

In the vehicle rear structure in which the reinforcing member includes the second plate portion, the reinforcing member may include a second mounting plate portion that is a flange portion provided in an inner end portion of the second plate portion in the width direction of the vehicle, and the reinforcing member may be disposed such that the second mounting plate portion faces the wheel house outer panel. Also, in the vehicle rear structure, the first mounting plate portion, the second mounting plate portion, and the second plate portion may configure a second U-shaped portion that has a substantially U-shaped section.

With the configuration of the above aspect, at the time of side collision, a collision load input to the reinforcing panel is transmitted to the wheel house outer panel through the flange portion of the reinforcing member. Thus, it is possible to restrain deformation of the reinforcing panel.

Moreover, in the above aspect, a length of the second mounting plate portion may be smaller than a length of the first mounting plate portion.

With the configuration of the above aspect, at the time of side collision, it is possible to transmit a collision load to the wheel house outer panel while restraining an increase in a mass of the reinforcing member.

A vehicle rear structure according to a second aspect of the disclosure, includes a rocker outer panel, a wheel house outer panel, a share panel, a reinforcing panel, and a reinforcing member is provided. The rocker outer panel is a panel extending in a vehicle front-rear direction. The wheel house outer panel is disposed behind the rocker outer panel in the vehicle front-rear direction. The share panel is provided on an inner side of the rocker outer panel in a width direction of the vehicle. The reinforcing panel is joined to a rear end portion of the rocker outer panel, and forms a closed section together with the wheel house outer panel and the share panel. The reinforcing member is disposed between either the share panel or the wheel house outer panel, and the reinforcing panel. The reinforcing member includes a first plate portion, an inner mounting plate portion, and an outer mounting plate portion. The inner mounting plate portion is provided in an inner end portion of the first plate portion in the width direction of the vehicle. The outer mounting plate portion is provided in an outer end portion of the first plate portion in the width direction of the vehicle. Then, the inner mounting plate portion is joined to the share panel or the wheel house outer panel, and the outer mounting plate portion is joined to the reinforcing panel.

With the configuration of the second aspect, the closed section formed by the wheel house outer panel, the reinforcing panel, and the share panel is reinforced by the reinforcing member. Therefore, for example, even when the closed section is twisted when there is a reverse phase input to a suspension, it is possible to restrain deformation of the closed section.

With the vehicle rear structure according to the aspects of the disclosure, it is possible to restrain deformation of the vehicle rear structure when it is twisted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure is described with reference to the drawings.

First of all, with reference to FIG. 1 to FIG. 4, a vehicle 100 is described. A vehicle rear structure 50 according to the embodiment of the disclosure is applied to the vehicle 100.

Figure 1:
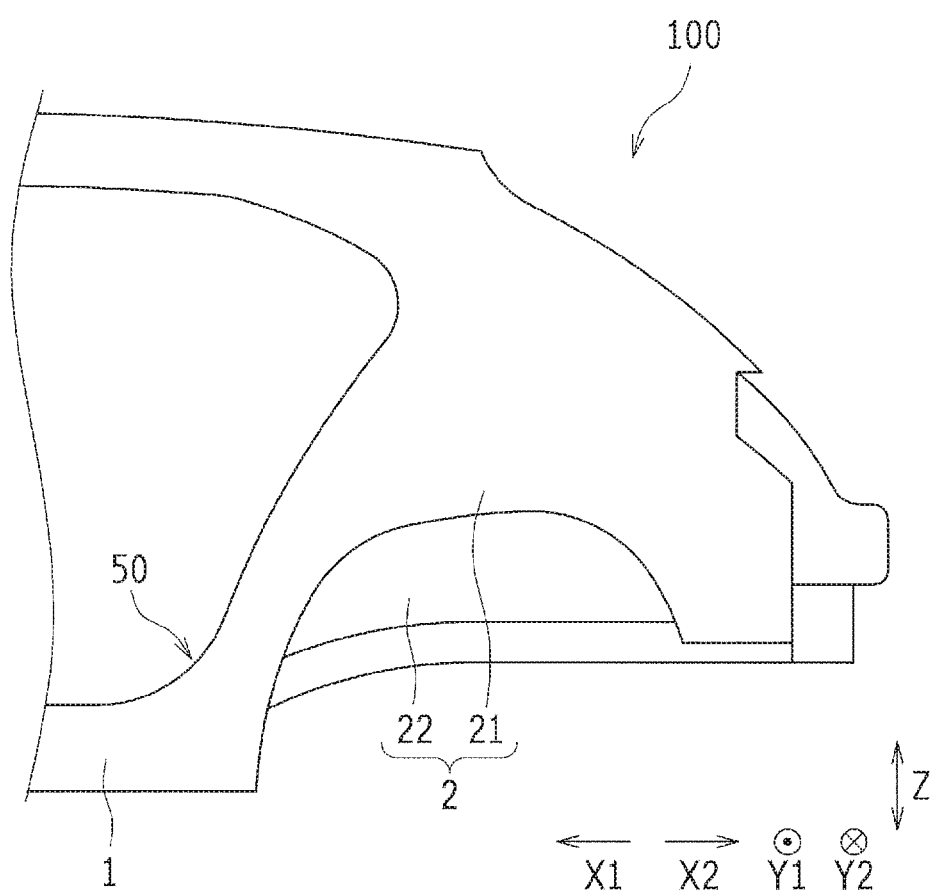
FIG. 1 is a side view showing a rough structure of a vehicle to which a vehicle rear structure according to an embodiment is applied.
Figure 2:
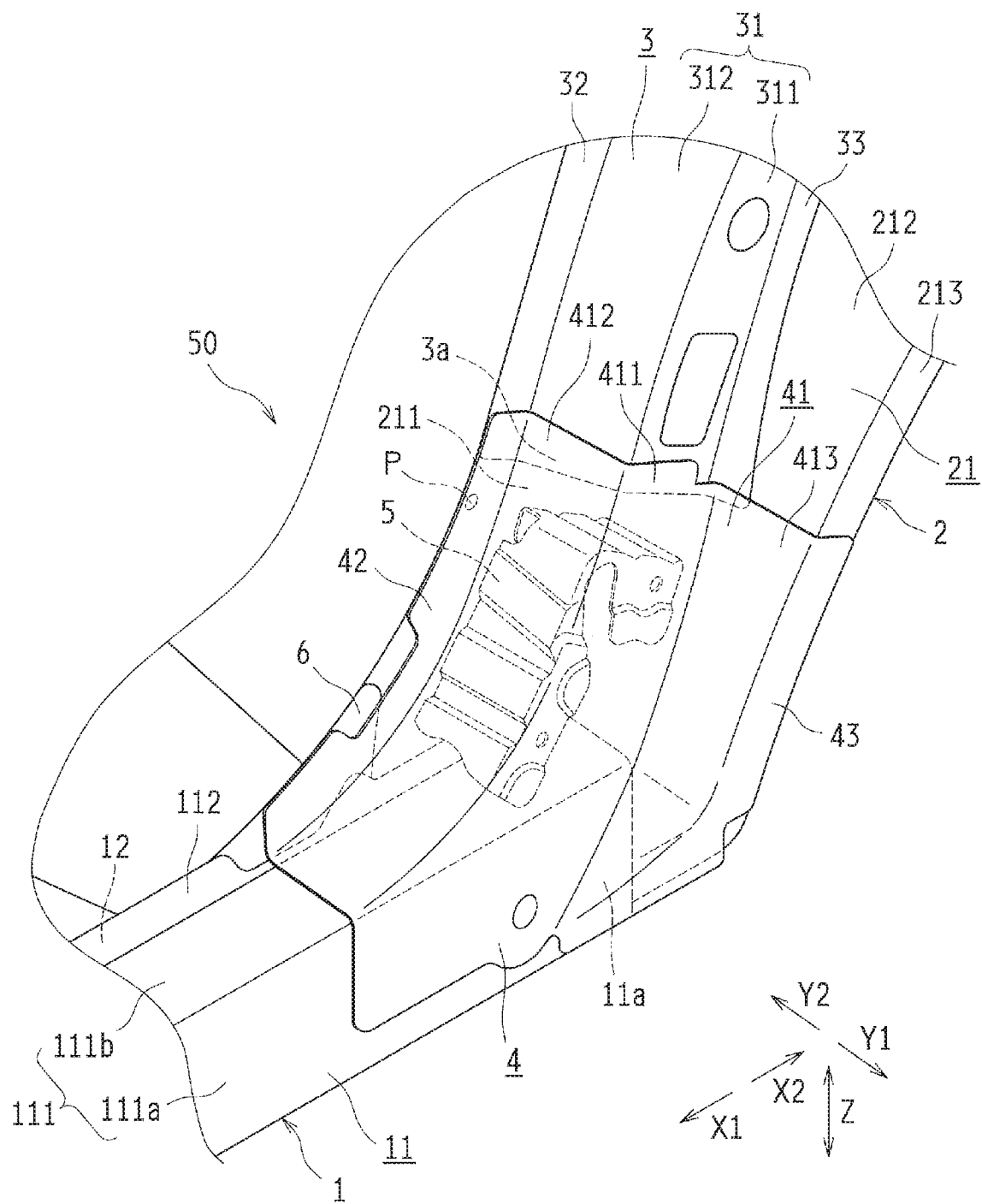
FIG. 2 is a perspective view of the vehicle rear structure according to the embodiment.
Figure 3:
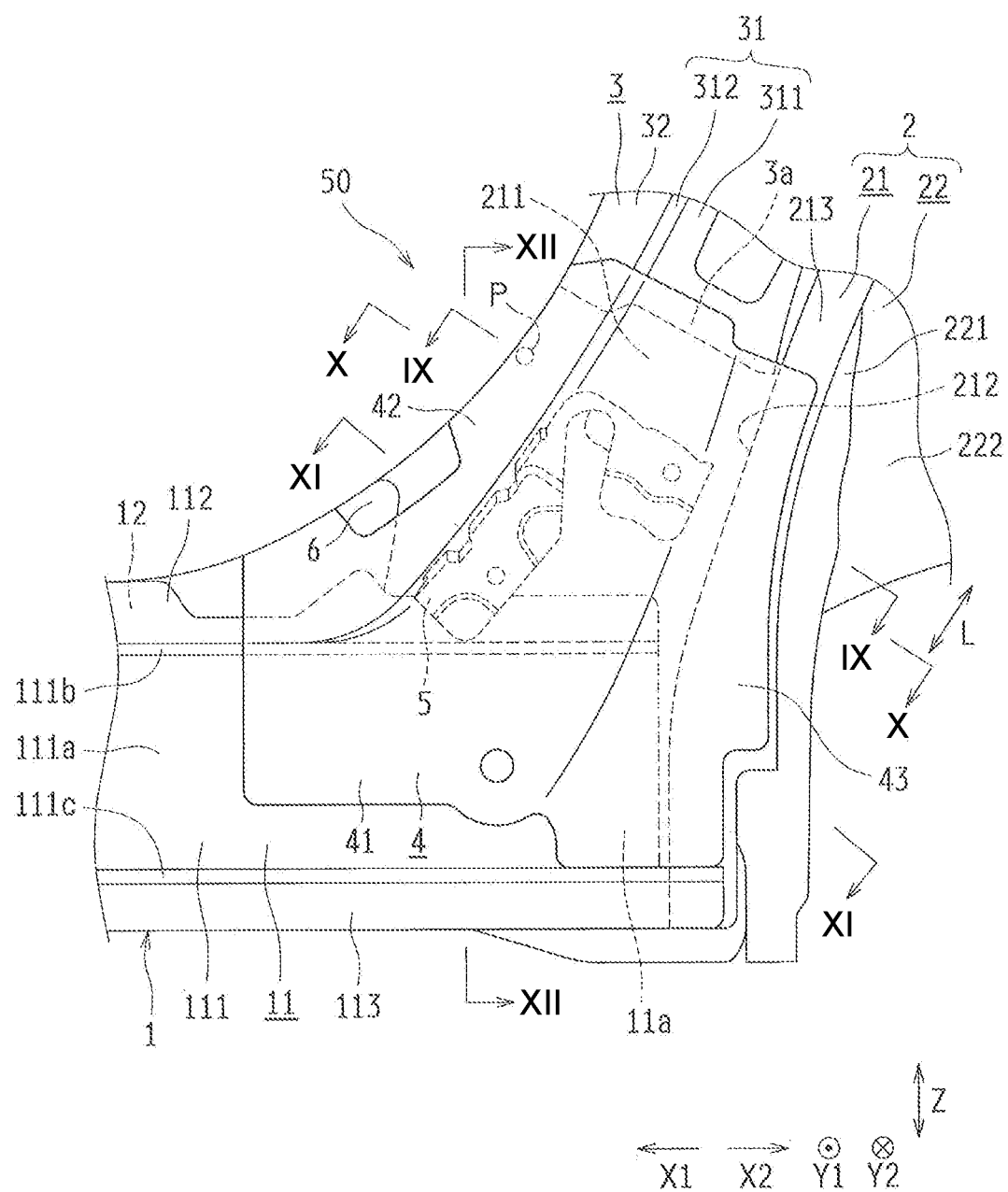
FIG. 3 is a side view of the vehicle rear structure shown in FIG. 2.

As shown in FIG. 1, in the vehicle 100, rockers 1 that form a part of a vehicle body skeleton are provided so as to extend in a vehicle front-rear direction (X1 and X2 directions). The rockers 1 are provided as a pair. One of the rockers 1 is disposed on the right, and the other rocker 1 is disposed on the left. The rockers 1 are disposed in both end portions of a vehicle lower part in a vehicle width direction (Y1 and Y2 directions). As shown in FIG. 2 and FIG. 3, each of the rockers 1 includes a rocker outer panel 11 and a rocker inner panel 12 that have an almost hat-shaped section. As the rocker outer panel 11 and the rocker inner panel 12 are joined to each other, a closed section is formed.

The rocker outer panel 11 includes a body portion 111 that has a substantially U-shaped section, and flange portions 112, 113 extending in directions separating from each other from an open end of the body portion 111. The body portion 111 is disposed so that its open end faces an inner side in the vehicle width direction (a Y2 direction side), and includes a side surface portion 111a, an upper surface portion 111b, and a lower surface portion 111c. The flange portion 112 is provided so as to extend upwardly from an inner end portion of the upper surface portion 111b in the vehicle width direction, and is joined to a flange portion (not shown) of the rocker inner panel 12. The flange portion 113 is provided so as to extend downwardly from an inner end portion of the lower surface portion 111c in the vehicle width direction, and is joined to a flange portion (not shown) of the rocker inner panel 12. Before a rear end portion 11a of the rocker outer panel 11, a share panel 6 is disposed between the rocker outer panel 11 and the rocker inner panel 12. The share panel 6 is provided in order to, for example, support a jack-up point (not shown).

Also, as shown in FIG. 1, in the vehicle 100, a wheel house 2 covering an upper side of a tire (not shown) is provided on a vehicle rear side (an X2 direction side) of the rocker 1. In other words, the wheel house 2 is a rear wheel house and includes a wheel house outer panel 21 and a wheel house inner panel 22.

Figure 4:
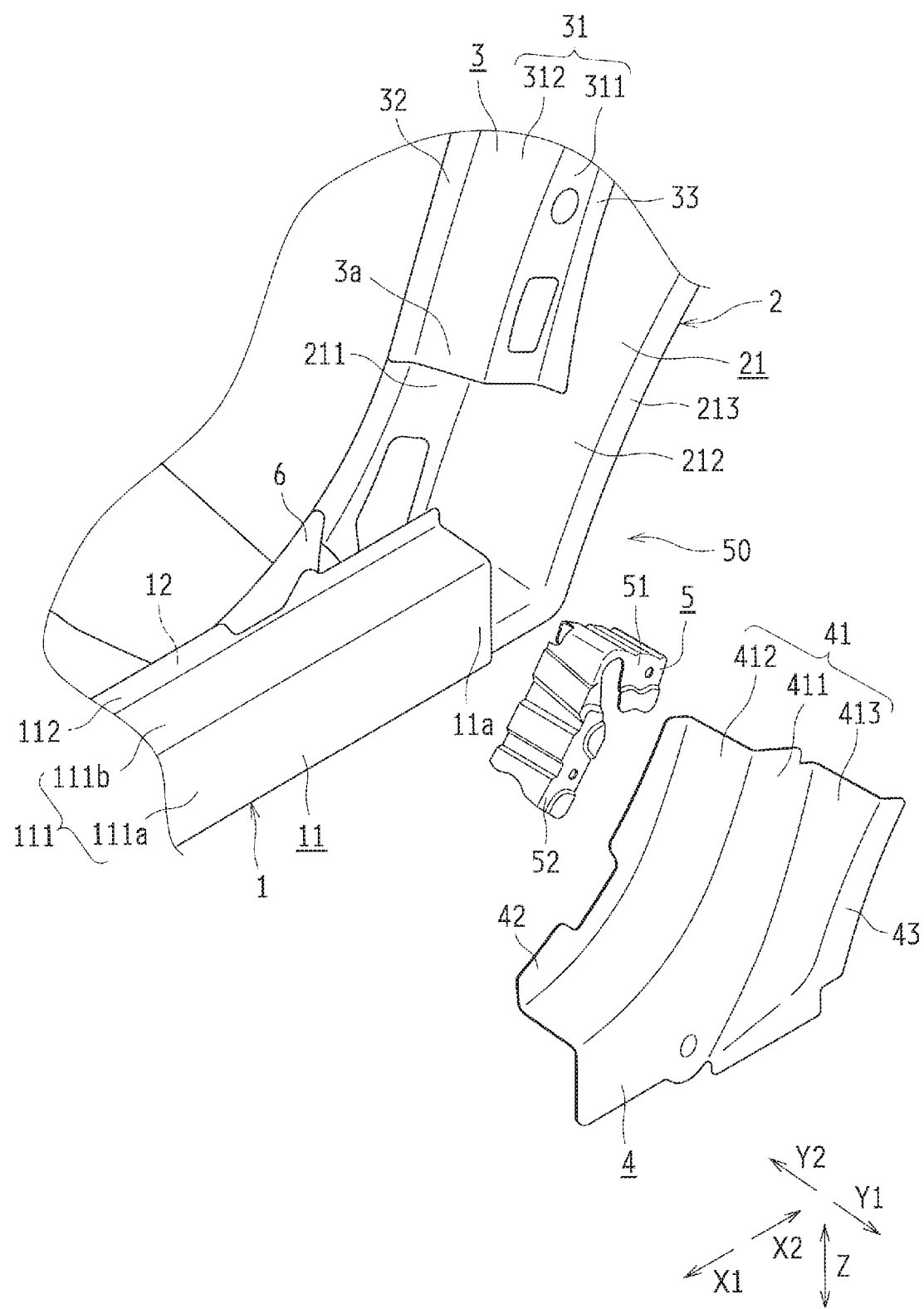
FIG. 4 is an exploded perspective view of the vehicle rear structure shown in FIG. 2.

As shown in FIG. 4, the wheel house outer panel 21 includes a flange portion 211 that structures a vehicle body side wall, an outer cover portion 212 extending from the flange portion 211 to an outer side in the vehicle width direction (a Y1 direction side), and a flange portion 213 extending to a tire side from the outer cover portion 212. The flange portions 211, 213 are arranged so as to be almost orthogonal to the vehicle width direction. The outer cover portion 212 and the flange portion 213 are provided so as to have an almost semicircular arc shape in a view in the vehicle width direction so as to go along an outer periphery of the tire. The flange portion 213 is provided in an outer end portion of the outer cover portion 212 in the vehicle width direction, and the flange portion 211 is provided in an inner end portion of the outer cover portion 212 in the vehicle width direction. A part of the flange portion 211 is disposed between the share panel 6 and the outer cover portion 212. The flange portion 112 in the rear end portion 11 a of the rocker outer panel 11 is joined to the flange portion 211. An opening of the rear end portion 11a of the rocker outer panel 11 is closed by a lower end portion of the outer cover portion 212.

The wheel house inner panel 22 (see FIG. 3) includes an inner cover portion 221, and a vertical wall portion 222. The inner cover portion 221 extends to the inner side in the vehicle width direction from a boundary between the flange portion 211 and the outer cover portion 212. The vertical wall portion 222 is provided in an inner end portion of the inner cover portion 221 in the vehicle width direction. The inner cover portion 221 is provided so as to have an almost semicircular arc shape in a view in the vehicle width direction so as to go along the outer periphery of the tire, and the vertical wall portion 222 is provided so as to have an almost semicircular shape in a view in the vehicle width direction.

Further, a quarter pillar reinforcement (not shown) is provided in the flange portion 211 of the wheel house outer panel 21. The quarter pillar reinforcement is provided so as to extend in an upper-lower direction (a Z direction), and is disposed on an outer side of the flange portion 211 in the vehicle width direction. A lower end portion of the quarter pillar reinforcement is disposed in the vicinity of an upper end portion of the outer cover portion 212. A quarter rock pillar reinforcement 3 is provided between the quarter pillar reinforcement and the rocker 1.

The quarter rock pillar reinforcement 3 is provided in order to reinforce the wheel house 2, and also connect the rocker 1 and the quarter pillar reinforcement. The quarter rock pillar reinforcement 3 forms a closed section together with the wheel house outer panel 21, and is provided so as to extend diagonally downward towards a vehicle front side along the outer cover portion 212 from the lower end portion of the quarter pillar reinforcement. This means that an upper end portion of the quarter rock pillar reinforcement 3 is connected with the quarter pillar reinforcement.

Specifically, the quarter rock pillar reinforcement 3 includes a body portion 31 having an almost L-shaped section, and flange portions 32, 33 that are provided in both end portions of the body portion 31 in a short direction. The flange portion 32 is joined to the flange portion 211, and the flange portion 33 is joined to the outer cover portion 212. The body portion 31 has a first surface portion 311, and a second surface portion 312. The first surface portion 311 extends from the flange portion 33 to the opposite side from the tire side, and the second surface portion 312 extends from the flange portion 32 to the outer side in the vehicle width direction. The first surface portion 311 is disposed so as to be almost orthogonal to the vehicle width direction. The second surface portion 312 is configured so as to be inclined slightly with respect to the vehicle width direction. An inner end portion of the second surface portion 312 in the vehicle width direction is disposed on the vehicle front side slightly more than an outer end portion of the second surface portion 312. The first surface portion 311 is disposed at a distance from the flange portion 211, and the second surface portion 312 is disposed at a distance from the outer cover portion 212. Therefore, an almost rectangular closed section is formed by the flange portion 211 and the outer cover portion 212 of the wheel house outer panel 21, and the first surface portion 311 and the second surface portion 312 of the quarter rock pillar reinforcement 3. A lower end portion 3a of the quarter rock pillar reinforcement 3 is disposed in the vicinity of the rear end portion 11a of the rocker outer panel 11. The flange portion 32 and the flange portion 211 form a part of an edge portion of a rear door opening.

Further, the vehicle rear structure 50 according to the embodiment is provided in a connecting portion between a rear end portion of the rocker 1 and a front end portion of the wheel house 2.

Vehicle Rear Structure

Next, with reference to FIG. 2 to FIG. 12, the vehicle rear structure 50 according to the embodiment is described. In FIG. 2 to FIG. 4, a side member outer panel 7 included in an outer plate of the vehicle 100 is not shown in consideration of visibility. In FIG. 9 to FIG. 12, welding points are shown by "×".

As shown in FIG. 4, the vehicle rear structure 50 includes the rocker outer panel 11, the wheel house outer panel 21, a rocker outer extension 4, and a bulk 5. The rocker outer extension 4 is an example of a "reinforcing panel" of the disclosure. The bulk 5 is an example of a "reinforcing member" of the disclosure.

The rocker outer extension 4 is joined to the rear end portion 11 a of the rocker outer panel 11 from the outer side in the vehicle width direction so as to extend the rocker outer panel 11. The rocker outer extension 4 is provided in order to connect the rocker outer panel 11 and the quarter rock pillar reinforcement 3. The rocker outer extension 4 is configured so as to form a closed section together with the wheel house outer panel 21. The closed section formed by the wheel house outer panel 21 and the rocker outer extension 4 is formed so as to extend in a direction inclined with respect to the upper-lower direction (an L direction in FIG. 3). Also, the closed section is provided so as to be linked to the closed section that is formed by the quarter rock pillar reinforcement 3 and the wheel house outer panel 21.

The rocker outer extension 4 includes a body portion 41, and flange portions 42, 43 provided in both end portions of the body portion 41, respectively. The flange portion 42 is joined to the flange portion 211 of the wheel house outer panel 21, and also joined to the share panel 6. The flange portion 42, the flange portion 211, and the share panel 6 configure a part of the edge portion of the rear door opening. The flange portion 43 is joined to the flange portion 213 of the wheel house outer panel 21. The body portion 41 includes a first surface portion 411, a second surface portion 412, and a third surface portion 413.

The first surface portion 411 is configured so as to connect the side surface portion 111a of the rocker outer panel 11 with the first surface portion 311 of the quarter rock pillar reinforcement 3. The first surface portion 411 is disposed so as to be almost orthogonal to the vehicle width direction, and curved so that an end portion of the first surface portion 411 on the vehicle rear side faces diagonally upward in a view in the vehicle width direction. The first surface portion 411 is disposed on outer sides of the side surface portion 111a and the first surface portion 311 in the vehicle width direction along the side surface portion 111a and the first surface portion 311. Then, the first surface portion 411 is configured so as to cover the side surface portion 111a on a rear end side of the rocker outer panel 11, and the first surface portion 311 on a lower end side of the quarter rock pillar reinforcement 3. A vehicle front side of the first surface portion 411 is joined to the side surface portion 111a of the rocker outer panel 11. The second surface portion 412 is disposed diagonally upward with respect to the first surface portion 411 towards vehicle front side, and the third surface portion 413 is disposed behind the first surface portion 411 in the vehicle front-rear direction.

The second surface portion 412 is configured so as to connect the upper surface portion 111*b* of the rocker outer panel 11 with the second surface portion 312 of the quarter rock pillar reinforcement 3. The first surface portion 411 is provided in an outer end portion of the second surface portion 412 in the vehicle width direction, and the flange portion 42 is provided in an inner end portion of the second surface portion 412 in the vehicle width direction. The second surface portion 412 is disposed above the upper surface portion 111*b* and the second surface portion 312 along the upper surface portion 111*b* and the second surface portion 312. Further, the second surface portion 412 is configured so as to cover the upper surface portion 111*b* on the rear end side of the rocker outer panel 11, and the second surface portion 312 on the lower end side of the quarter rock pillar reinforcement 3. A vehicle front side of the second surface portion 412 is joined to the upper surface portion 111*b* of the rocker outer panel 11. The second surface portion 412 is configured so as to be slightly inclined with respect to the vehicle width direction, and is disposed so that an inner end portion of the second surface portion 412 in the vehicle width direction is on the vehicle front side slightly more than an outer end portion of the second surface portion 412.

The third surface portion 413 is provided along the outer cover portion 212 of the wheel house outer panel 21. The first surface portion 411 is provided in an inner end portion of the third surface portion 413 in the vehicle width direction, and the flange portion 43 is provided in an outer end portion of the third surface portion 413 in the vehicle width direction.

Therefore, the flange portion 211 and the outer cover portion 212 of the wheel house outer panel 21, and the first surface portion 411 and the second surface portion 412 of the rocker outer extension 4 form an almost rectangular closed section. Also, a lower end portion of the closed section is closed by the upper surface portion 111*b* of the rear end portion 11*a* of the rocker outer panel 11.

Figure 5:
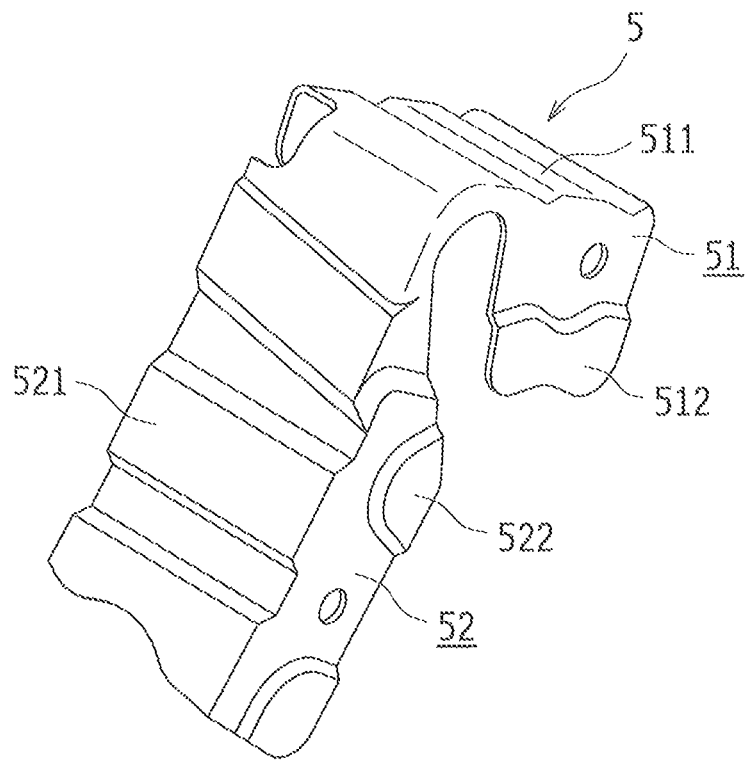
FIG. 5 is a perspective view of a bulk of the vehicle rear structure shown in FIG. 2
Figure 6:
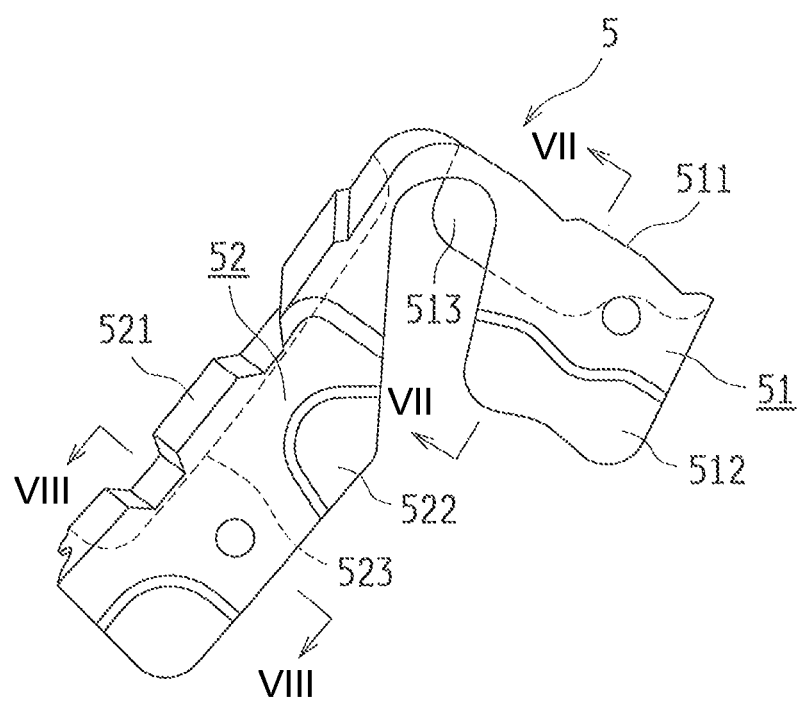
FIG. 6 is a side view of the bulk shown in FIG. 5.
Figure 7:
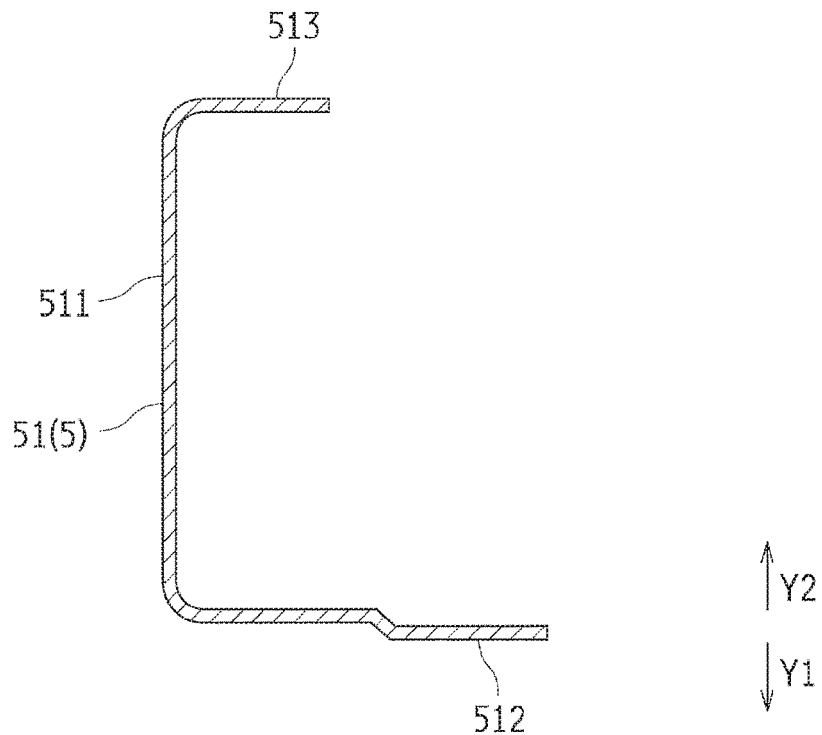
FIG. 7 is a sectional end surface view taken along the line VII-VII in FIG. 6.
Figure 8:
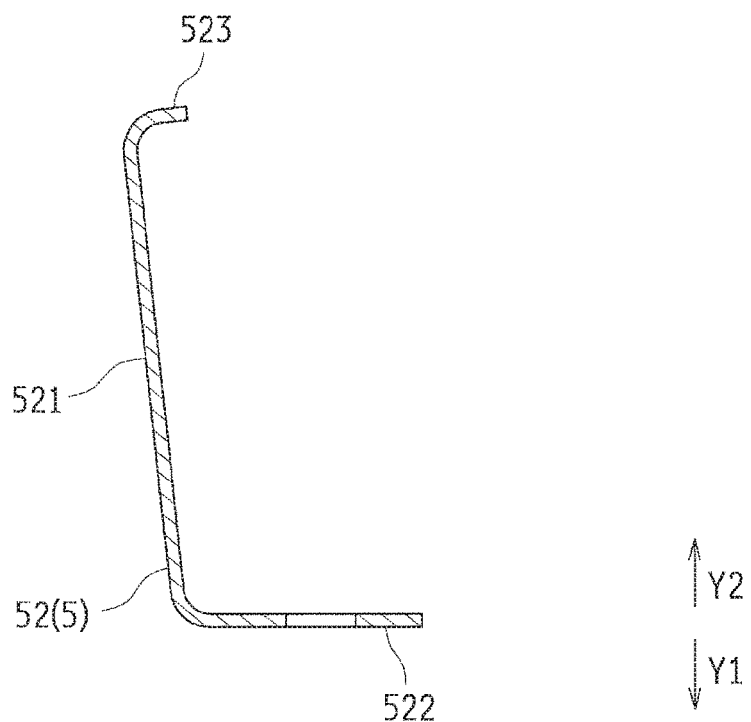
FIG. 8 is a sectional end surface view taken along the line VIII-VIII in FIG. 6.

The bulk 5 is provided in order to reinforce the vehicle rear structure 50, and disposed between the wheel house outer panel 21 and the rocker outer extension 4. This means that the bulk 5 is disposed in an internal space S (see FIG. 9 to FIG. 12) of the closed section formed by the wheel house outer panel 21 and the rocker outer extension 4. As shown in FIG. 5 and FIG. 6, the bulk 5 includes a first U-shaped portion 51 and a second U-shaped portion 52 that have substantially U-shaped sections, respectively.

The first U-shaped portion 51 has a first plate portion 511, and the second U-shaped portion 52 has a second plate portion 521. The first plate portion 511 and the second plate portion 521 are connected with each other. An end portion of the first plate portion 511 on the vehicle front side is connected with an end portion of the second plate portion 521 on the vehicle rear side. The first plate portion 511 and the second plate portion 521 are provided so as to have an almost L-shape in a view in the vehicle width direction, and disposed so as to be orthogonal to each other. The end portion of the first plate portion 511 on the vehicle front side is an example of "an end portion of a first plate portion in a direction that intersects with the vehicle width direction" according to the disclosure.

The first U-shaped portion 51 includes flange portions 512, 513 (see FIG. 7) that are provided in both end portions of the first plate portion 511 in the vehicle width direction, respectively. The flange portions 512, 513 are provided so as to extend from the first plate portion 511 to a second plate portion 521 side (diagonally downward to the vehicle front side), and disposed so as to face each other in the vehicle width direction. The flange portion 512 is disposed in an outer end portion of the first plate portion 511 in the vehicle width direction, and the flange portion 513 is disposed on an inner end portion of the first plate portion 511 in the vehicle width direction. The flange portions 512, 513 are examples of an "outer mounting plate portion" and an "inner mounting plate portion" of the disclosure, respectively.

The second U-shaped portion 52 has flange portions 522, 523 (see FIG. 8) that are provided in both end portions of the second plate portion 521 in the vehicle width direction, respectively. The flange portions 522, 523 are arranged so as to extend from the second plate portion 521 to a first plate portion 511 side (diagonally downward to the vehicle rear side), and disposed so as to face each other in the vehicle width direction. The flange portion 522 is disposed in an outer end portion of the second plate portion 521 in the vehicle width direction, and the flange portion 523 is disposed in an inner end portion of the second plate portion 521 in the vehicle width direction. A length of the flange portion 523 (a projection amount from the second plate portion 521) is smaller than a length of the flange portion 522. The second plate portion 521 is configured so as to be slightly inclined with respect to the vehicle width direction, and disposed so that the inner end portion of the second plate portion 521 in the vehicle width direction is on the vehicle front side slightly more than the outer end portion of the second plate portion 521. The flange portions 522, 523 are examples of a "first mounting plate portion" and a "second mounting plate portion" of the disclosure, respectively.

Figure 10:
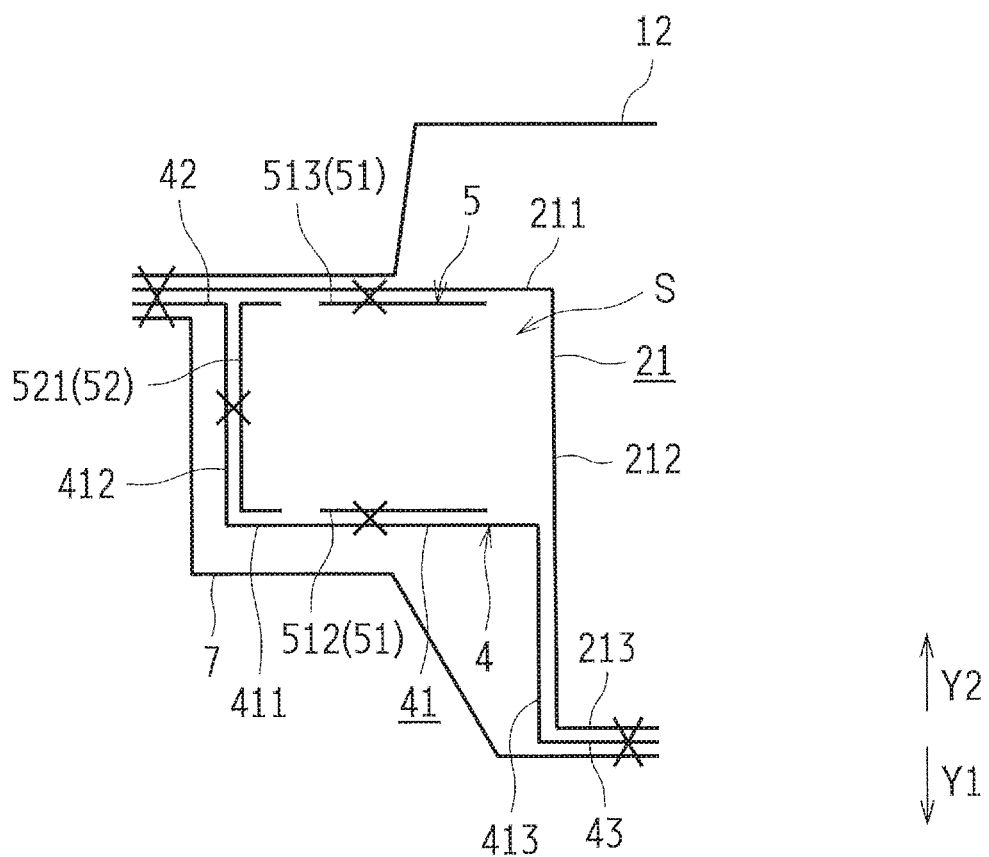
FIG. 10 is a schematic sectional end surface view taken along the line X-X in FIG. 3, and is also a schematic sectional end surface view of a surface including a flange portion of the first U-shaped portion in the extending direction of the closed section formed by the rocker outer extension and the wheel house outer panel.
Figure 11:
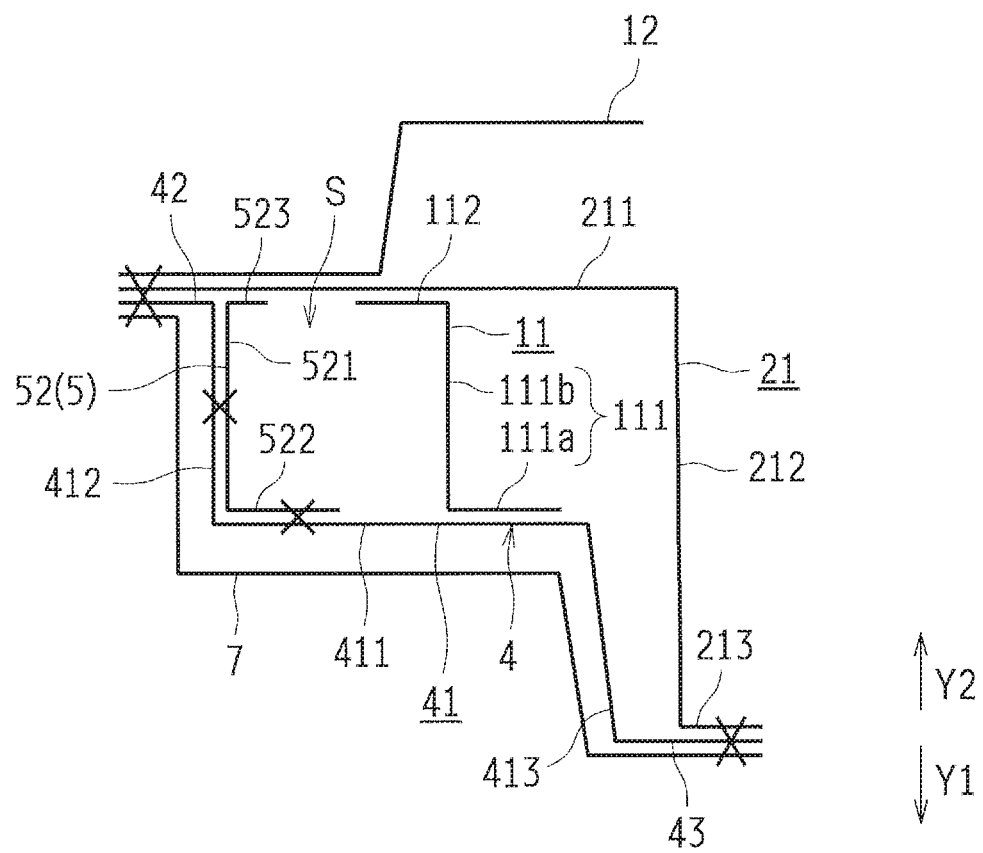
FIG. 11 is a schematic sectional end surface view taken along the line XI-XI in FIG. 3, and is a schematic sectional end surface view of a surface including a flange portion of a second U-shaped portion in the extending direction of the closed section formed by the rocker outer extension and the wheel house outer panel.

As shown in FIG. 3, the bulk 5 is disposed so that the second plate portion 521 (see FIG. 6) goes along the second surface portion 412 (see FIG. 2) of the rocker outer extension 4. As shown in FIG. 10 and FIG. 11, the second plate portion 521 is joined to the second surface portion 412. On an outer side of the second U-shaped portion 52 in the vehicle width direction, a rear end of an impact beam of a rear door (not shown) is disposed.

Figure 9:
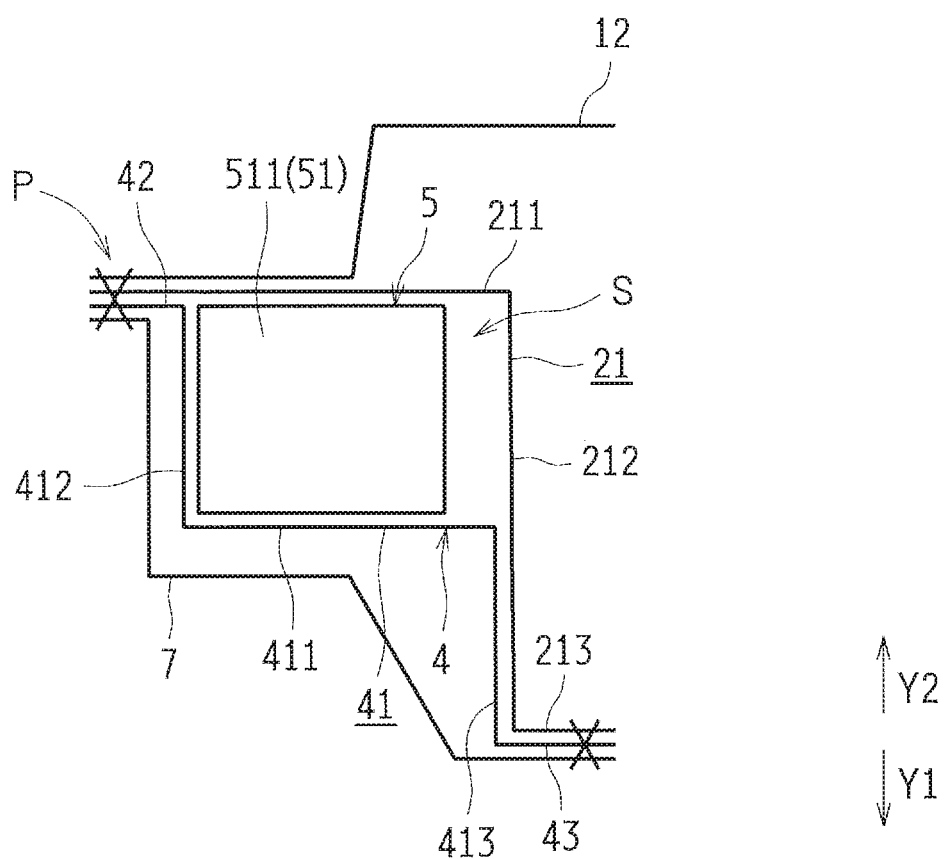
FIG. 9 is a schematic sectional end surface view taken along the line IX-IX in FIG. 3, and is also a schematic sectional end surface view of a surface including a first plate portion of a first U-shaped portion in an extending direction of a closed section formed by a rocker outer extension and a wheel house outer panel.

As shown in FIG. 9, the first plate portion 511 of the bulk 5 is disposed so as to partition the closed section (the internal space S) that is formed by the rocker outer extension 4 and the wheel house outer panel 21. This means that the first plate portion 511 is disposed so as to be almost orthogonal to an extending direction (the L direction in FIG. 3) of the closed section that is formed by the rocker outer extension 4 and the wheel house outer panel 21. Further, as shown in FIG. 2 and FIG. 3, on an extended line of the first plate portion 511, a welding point P is disposed. At the welding point P, the flange portion 211 of the wheel house outer panel 21 and the flange portion 42 of the rocker outer extension 4 are welded. The welding point P is disposed at a position where high stress is generated due to twisting when, for example, there is a reverse phase input to a suspension in a case where the bulk 5 is not provided. In FIG. 2 and FIG. 3, welding points other than the welding point P are not shown.

Figure 12:
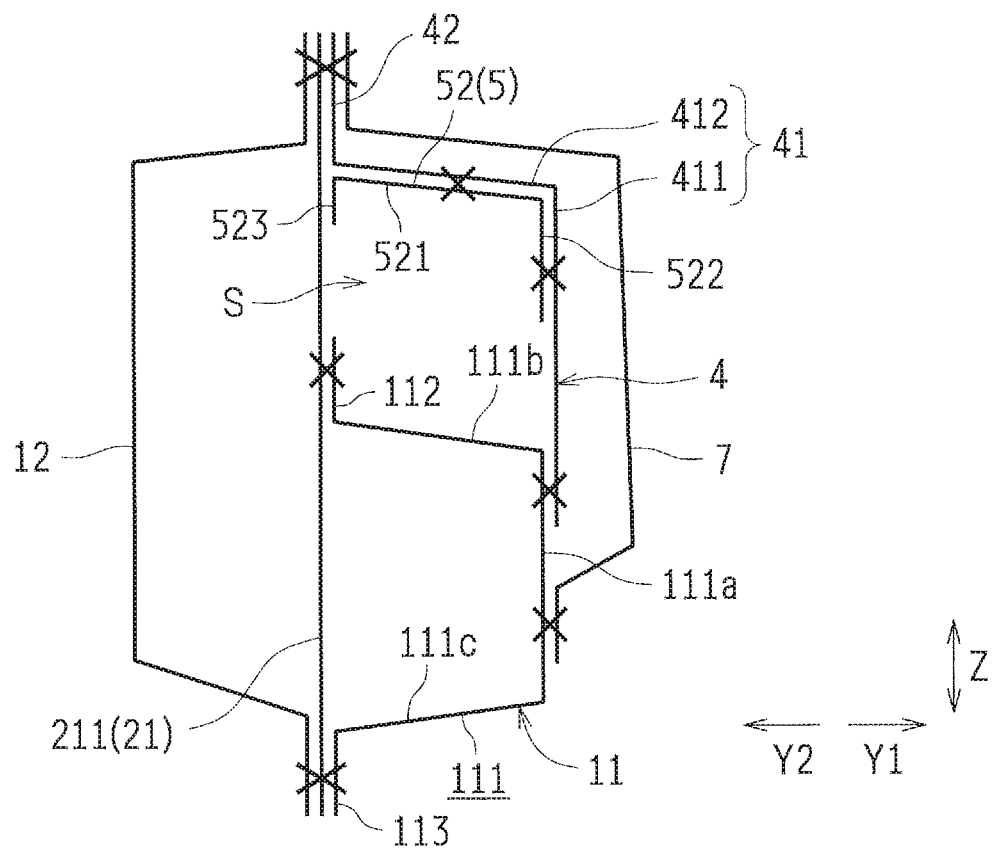
FIG. 12 is a schematic sectional end surface view taken along the line XII-XII in FIG. 3, and is a schematic sectional end surface view of a surface including the second U-shaped portion in a vehicle front-rear direction.

Moreover, as shown in FIG. 10, in the first U-shaped portion 51, the flange portion 512 is joined to the first surface portion 411 of the rocker outer extension 4, and the flange portion 513 is joined to the flange portion 211 of the wheel house outer panel 21. As shown in FIG. 11 and FIG. 12, in the second U-shaped portion 52, the flange portion 522 is joined to the first surface portion 411 of the rocker outer extension 4, and the flange portion 523 is disposed so as to face the flange portion 211 of the wheel house outer panel 21. This means that the flange portion 523 is not joined to the flange portion 211 of the wheel house outer panel 21.

The side member outer panel 7 is provided on outer sides of the rocker outer panel 11, the rocker outer extension 4, the wheel house outer panel 21, and the quarter rock pillar reinforcement 3 in the vehicle width direction.

Operation Example when there is Reverse Phase Input

Figure 13:
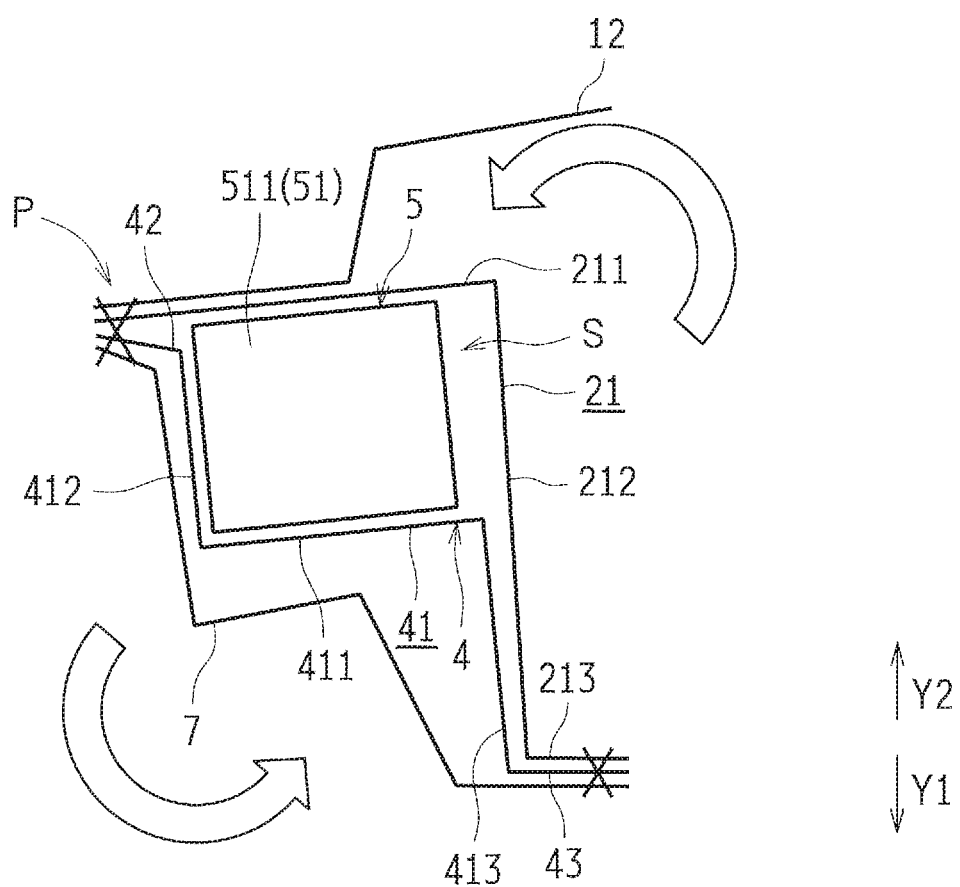
FIG. 13 is a view describing an operation example of the vehicle rear structure according to the embodiment when there is a reverse phase input.

Next, described with reference to FIG. 13 is an operation example of the vehicle rear structure 50 according to the embodiment when there is a reverse phase input.

With the vehicle rear structure 50, when, for example, there is a reverse phase input to a suspension (when loads are input from a road surface in vertically reverse phases between front and rear wheels and right and left wheels), even if the closed section formed by the rocker outer extension 4 and the wheel house outer panel 21 is twisted as shown by outlined arrows in FIG. 13, deformation of the closed section is restrained because the bulk 5 is disposed in the internal space S of the closed section. Therefore, stress that is generated at the welding point P is restrained. At the welding point P, the flange portion 211 of the wheel house outer panel 21 and the flange portion 42 of the rocker outer extension 4 are welded.

Figure 14:
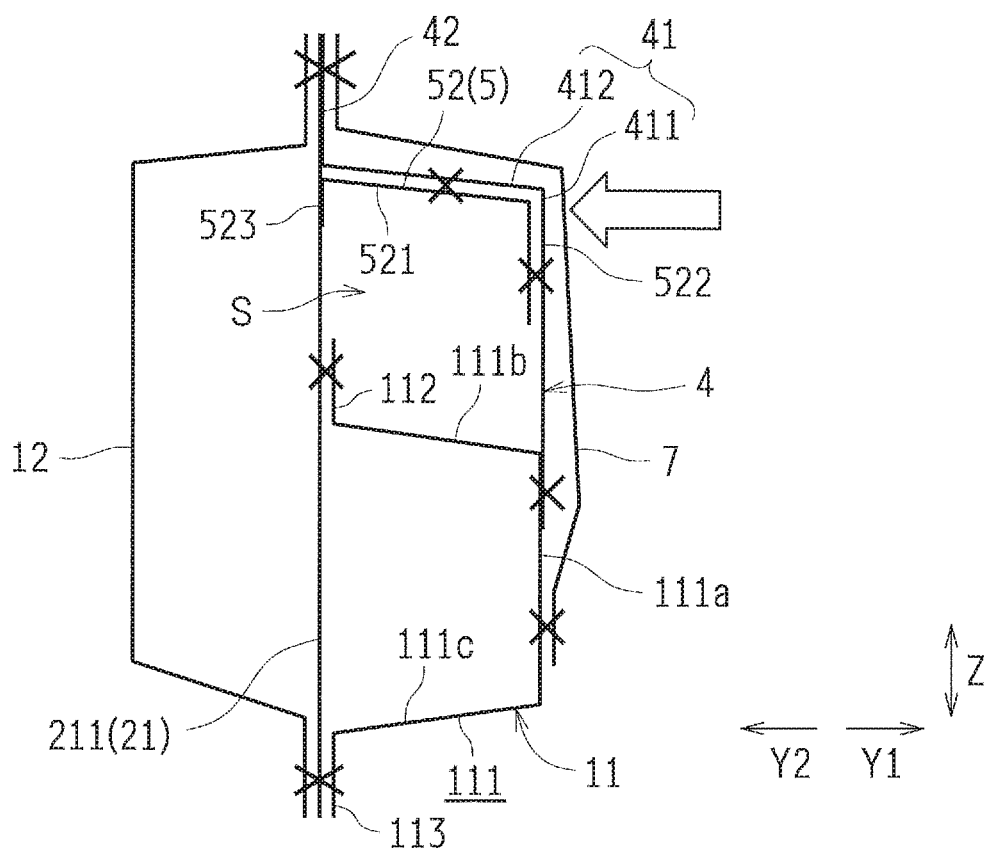
FIG. 14 is a view describing an operation example of the vehicle rear structure according to the embodiment at the time of side collision.

Next, described with reference to FIG. 14 is an operation example of the vehicle rear structure 50 according to the embodiment at the time of side collision.

In the vehicle rear structure 50, when a collision load is input to the rocker outer extension 4 as shown by an outlined arrow in FIG. 14 at the time of side collision, the flange portion 523 of the bulk 5 hits the flange portion 211 of the wheel house outer panel 21. Thus, the collision load input to the rocker outer extension 4 is transmitted to the rocker inner panel 12 through the bulk 5 and the wheel house outer panel 21. This means that the collision load input to the rocker outer extension 4 is dispersed to the rocker inner panel 12. Thus, deformation of the rocker outer extension 4 is restrained.

Next, effects of the embodiment are described. In the embodiment, as described earlier, the bulk 5 is provided between the wheel house outer panel 21 and the rocker outer extension 4. Further, the bulk 5 includes the first U-shaped portion 51. The flange portion 512 of the first U-shaped portion 51 is joined to the rocker outer extension 4, and the flange portion 513 of the first U-shaped portion 51 is joined to the wheel house outer panel 21. With this configuration, the bulk 5 reinforces the closed section formed by the wheel house outer panel 21 and the rocker outer extension 4. Therefore, even when, for example, the closed section is twisted at the time of a reverse phase input to the suspension, it is possible to restrain deformation (sectional collapse) of the closed section. Thus, it is possible to restrain stress that is generated at the welding point P where the wheel house outer panel 21 and the rocker outer extension 4 are welded.

Further, in the embodiment, the first plate portion 511 of the first U-shaped portion 51 is disposed so as to partition the closed section that is formed by the wheel house outer panel 21 and the rocker outer extension 4. Thus, it is possible to efficiently restrain deformation of the closed section.

Furthermore, in the embodiment, the bulk 5 includes the second U-shaped portion 52, and the second plate portion 521 and the flange portion 522 of the second U-shaped portion 52 are joined to the rocker outer extension 4, thereby reinforcing the rocker outer extension 4. Then, at the time of side collision, it is possible to restrain the rocker outer extension 4 from being deformed by the rear end of the impact beam of the rear door.

Moreover, in the embodiment, the second U-shaped portion 52 is provided with the flange portion 523 that is disposed so as to face the wheel house outer panel 21. Therefore, at the time of side collision, a collision load input to the rocker outer extension 4 is transmitted to the rocker inner panel 12 through the bulk 5 and the wheel house outer panel 21. Therefore, it is possible to restrain deformation of the rocker outer extension 4.

In the embodiment, the length of the flange portion 523 is smaller than the length of the flange portion 522. Therefore, it is possible to transmit a collision load to the rocker inner panel 12 at the time of side collision while restraining an increase in a mass of the bulk 5.

Further, in the embodiment, the rear end portion 11a of the rocker outer panel 11 extends to the outer cover portion 212. Therefore, compared to a divided structure in which the rear end of the rocker outer panel is made of a plurality of panels, rigidity of the rocker outer panel 11 is improved. Hence, it is possible to restrain deformation at the time of rear end collision.

Next, as other embodiments, modifications of the embodiment are described. The embodiment disclosed herein is only an example in all respects, and shall not be a reason for limited interpretation. Therefore, the technical scope of the disclosure shall not be interpreted based on the above embodiment only, and is defined based on the description of the claims. Further, the technical scope of the disclosure includes all changes within meanings and scopes equivalent to the claims.

For example, the embodiment shows the instance where the rocker outer extension 4 is provided. However, the disclosure is not limited to this. As a vehicle rear structure according to a first modification, the rocker outer extension may not be provided, the lower end portion of the quarter rock pillar reinforcement may be provided so as to extend to the rear end portion of the rocker outer panel, and the quarter rock pillar reinforcement may be connected with the rocker outer panel. In this case, the bulk is disposed between the quarter rock pillar reinforcement and the wheel house outer panel, and the outer side flange portion (the outer mounting plate portion) of the first plate portion of the bulk in the vehicle width direction, and the outer side flange portion (the first mounting plate portion) of the second plate portion in the vehicle width direction are joined to the quarter rock pillar reinforcement. The quarter rock pillar reinforcement in this case is an example of the "reinforcing panel" of the disclosure.

Further, the embodiment shows the instance in which the wheel house outer panel 21 and the rocker outer extension 4 form the closed section, and the bulk 5 is disposed inside the closed section. However, the disclosure is not limited to this. As a vehicle rear structure according to a second modification, when the share panel is disposed in the vicinity of a cover portion of the wheel house outer panel on the outer side, a closed section may be formed by the share panel, the wheel house outer panel, and the rocker outer extension, and the bulk may be disposed inside the closed section. In this case, when the bulk is disposed between the share panel and the rocker outer extension, the flange portion of the first plate portion on the inner side in the vehicle width direction (the inner mounting plate portion) is joined to the share panel, and the flange portion of the second plate portion on the inner side in the vehicle width direction is disposed so as to face the share panel. Also, when the second U-shaped portion of the bulk is disposed between the share panel and the rocker outer extension, and the first U-shaped portion of the bulk is disposed between the wheel house outer panel and the rocker outer extension, the flange portion of the first plate portion on the inner side in the vehicle width direction (the inner mounting plate portion) is joined to the wheel house outer panel, and the flange portion of the second plate portion on the inner side in the vehicle width direction is disposed so as to face the share panel.

Moreover, the embodiment shows the instance in which the bulk 5 includes the second U-shaped portion 52. However, the disclosure is not limited to this. As a vehicle rear structure according to a third modification, the bulk does not need to include the second U-shaped portion. This means that the bulk may be made of the first U-shaped portion only.

The embodiment shows the instance in which the first plate portion 511 partitions the closed section that is formed by the rocker outer extension 4 and the wheel house outer panel 21. However, the disclosure is not limited this. As a vehicle rear structure according to a fourth modification, the first plate portion does not need to partition the closed section that is formed by the rocker outer extension and the wheel house outer panel. This means that, although the example is shown in which the first plate portion 511 and the second plate portion 521 are provided so as to have the almost L-shape in a view in the vehicle width direction, the disclosure is not limited to this, and the first plate portion and the second plate portion may be provided so as to have a straight shape in a view in the vehicle width direction.

Furthermore, the embodiment shows the instance in which the welding point P is disposed on the extended line of the first plate portion 511. However, the disclosure is not limited to this. As a vehicle rear structure according to a fifth modification, the welding point does not need to be disposed on the extended line of the first plate portion.

Furthermore, the embodiment shows the instance in which the flange portion 523 is provided in the inner end portion of the second plate portion 521 in the vehicle width direction. However, the disclosure is not limited to this. As a vehicle rear structure according to a sixth modification, the flange portion may not be provided in the inner end portion of the second plate portion in the vehicle width direction.

Moreover, the embodiment shows the instance in which the flange portion 523 of the second plate portion 521 on the inner side in the vehicle width direction is not joined to the flange portion 211 of the wheel house outer panel 21. However, the disclosure is not limited to this. As a vehicle rear structure according to a seventh modification, the flange portion of the second plate portion on the inner side in the vehicle width direction may be joined to the flange portion of the wheel house outer panel.

Further, the embodiment shows the instance in which the length of the flange portion 523 of the second plate portion 521 on the inner side in the vehicle width direction is smaller than the length of the flange portion 522 on the outer side in the vehicle width direction. However, the disclosure is not limited to this. As a vehicle rear structure according to an eighth modification, the length of the flange portion (second mounting plate portion) of the second plate portion on the inner side in the vehicle width direction may not be smaller than the length of the flange portion (first mounting plate portion) on the outer side in the vehicle width direction.

As a vehicle rear structure according to a ninth modification of the embodiment, the bulk 5 may include a third plate portion (not shown), the third plate portion may be provided in the end portion of the second plate portion 521 on the vehicle front side, and the third plate portion may be disposed so as to face the first plate portion 511.

The disclosure is applicable to a vehicle rear structure that includes a rocker outer panel extending in a vehicle front-rear direction, and a wheel house outer panel disposed behind the rocker outer panel in the vehicle front-rear direction.

What is claimed is:

1. A vehicle rear structure comprising:
    a rocker outer panel extending in a front-rear direction of a vehicle;
    a wheel house outer panel disposed behind the rocker outer panel in the front-rear direction of the vehicle;
    a reinforcing panel that is joined to a rear end portion of the rocker outer panel, and forms a closed section together with the wheel house outer panel; and
    a reinforcing member that is disposed between the wheel house outer panel and the reinforcing panel, the reinforcing member including a first plate portion, an inner mounting plate portion provided in an inner end portion of the first plate portion in a width direction of the vehicle, and an outer mounting plate portion provided in an outer end portion of the first plate portion in the width direction of the vehicle, the inner mounting plate portion being joined to the wheel house outer panel, and the outer mounting plate portion being joined to the reinforcing panel.

2. The vehicle rear structure according to claim 1, wherein the reinforcing panel is a rocker outer extension, the rocker outer extension being configured to be joined to the rear end portion of the rocker outer panel from an outer side in the width direction of the vehicle, and the rocker outer extension being configured to expand the rocker outer panel.

3. The vehicle rear structure according to claim 1, wherein the first plate portion is disposed so as to partition the closed section.

4. The vehicle rear structure according to claim 3, wherein the inner mounting plate portion, the outer mounting plate portion, and the first plate portion configure a first U-shaped portion that has a substantially U-shaped section.

5. The vehicle rear structure according to claim 1, wherein:
    the reinforcing member includes a second plate portion provided in an end portion of the first plate portion in a direction that intersects with the width direction of the vehicle, and a first mounting plate portion provided in an outer end portion of the second plate portion in the width direction of the vehicle; and
    the second plate portion and the first mounting plate portion are joined to the reinforcing panel.

6. The vehicle rear structure according to claim 5, wherein:
    the reinforcing member includes a second mounting plate portion that is a flange portion provided in an inner end portion of the second plate portion in the width direction of the vehicle; and
    the reinforcing member is disposed such that the second mounting plate portion faces the wheel house outer panel.

7. The vehicle rear structure according to claim 6, wherein the first mounting plate portion, the second mounting plate portion, and the second plate portion configure a second U-shaped portion that has a substantially U-shaped section.

8. The vehicle rear structure according to claim 6, wherein a length of the second mounting plate portion is smaller than a length of the first mounting plate portion.

9. A vehicle rear structure comprising:
    a rocker outer panel extending in a front-rear direction of a vehicle;
    a wheel house outer panel disposed behind the rocker outer panel in the front-rear direction of the vehicle;

a share panel provided on an inner side of the rocker outer panel in a width direction of the vehicle;

a reinforcing panel that is joined to a rear end portion of the rocker outer panel, and forms a closed section together with the wheel house outer panel and the share panel; and a reinforcing member that is disposed between either the share panel or the wheel house outer panel, and the reinforcing panel, the reinforcing member including a first plate portion, an inner mounting plate portion provided in an inner end portion of the first plate portion in the width direction of the vehicle, and an outer mounting plate portion provided in an outer end portion of the first plate portion in the width direction of the vehicle, the inner mounting plate portion being joined to the share panel or the wheel house outer panel, and the outer mounting plate portion being joined to the reinforcing panel.

* * * * *